United States Patent
Stern et al.

(10) Patent No.: US 9,966,592 B2
(45) Date of Patent: *May 8, 2018

(54) BATTERY ELECTRODE AND METHOD FOR PRODUCING SAME

(75) Inventors: Rainer Stern, Ulm (DE); Michael Kasper, Illertissen (DE)

(73) Assignee: ZENTRUM FUER SONNENENERGIE-UND WASSERSTOFF-FORSCHUNG BADEN-WUERTTEMBERG GEMEINNUETZIGE STIFTUNG (DE)

(*) Notice: Subject to any disclaimer, the term of this patent is extended or adjusted under 35 U.S.C. 154(b) by 338 days.

This patent is subject to a terminal disclaimer.

(21) Appl. No.: 13/990,366

(22) PCT Filed: Nov. 25, 2011

(86) PCT No.: PCT/EP2011/005945
§ 371 (c)(1),
(2), (4) Date: May 29, 2013

(87) PCT Pub. No.: WO2012/072221
PCT Pub. Date: Jun. 7, 2012

(65) Prior Publication Data
US 2013/0252086 A1    Sep. 26, 2013

(30) Foreign Application Priority Data
Nov. 29, 2010 (DE) .................. 10 2010 062 140

(51) Int. Cl.
| H01M 4/70 | (2006.01) |
| H01M 4/04 | (2006.01) |
| H01M 2/26 | (2006.01) |
| H01M 10/04 | (2006.01) |
| H01M 10/0585 | (2010.01) |
| H01M 4/02 | (2006.01) |
| B23K 26/40 | (2014.01) |
| H01M 10/052 | (2010.01) |
| B23K 101/34 | (2006.01) |

(52) U.S. Cl.
CPC .......... *H01M 4/0435* (2013.01); *B23K 26/40* (2013.01); *H01M 2/26* (2013.01); *H01M 4/02* (2013.01); *H01M 4/0402* (2013.01); *H01M 4/70* (2013.01); *H01M 10/04* (2013.01); *H01M 10/0585* (2013.01); *B23K 2201/35* (2015.10); *H01M 10/052* (2013.01); *Y10T 29/49115* (2015.01)

(58) Field of Classification Search
CPC combination set(s) only.
See application file for complete search history.

(56) References Cited

U.S. PATENT DOCUMENTS

| 5,766,798 | A | 6/1998 | Bechtold et al. |
| 6,051,338 | A | 4/2000 | Miyazaki et al. |
| 8,679,677 | B1* | 3/2014 | Tamaki et al. ................ 429/209 |
| 2003/0228517 | A1 | 12/2003 | Holl et al. |
| 2005/0208354 | A1 | 9/2005 | Hahn et al. |
| 2006/0035152 | A1 | 2/2006 | Nishimura et al. |
| 2008/0032236 | A1 | 2/2008 | Wallace et al. |
| 2009/0148764 | A1 | 6/2009 | Kwak et al. |
| 2009/0304912 | A1* | 12/2009 | Kwak et al. ................. 427/108 |
| 2011/0311883 | A1 | 12/2011 | Oukassi et al. |

FOREIGN PATENT DOCUMENTS

| DE | 10224452 C1 | 11/2003 |
| DE | 102008053595 A1 | 10/2008 |
| DE | 102008041713 A1 | 3/2010 |
| EP | 0766327 A1 | 4/1997 |
| EP | 0924783 | 4/2003 |
| EP | 1359633 A1 | 5/2003 |
| EP | 1596459 A1 | 11/2005 |
| JP | 05314969 | * 11/1993 |
| JP | 2000149911 A | 5/2000 |
| JP | 2000208129 A | 7/2000 |
| JP | 2003308833 A | 3/2003 |
| JP | 2003187763 A | 7/2003 |
| WO | WO2008011061 A1 | 1/2008 |
| WO | WO 2009055529 A1 | 4/2009 |
| WO | WO2010105917 A1 | 9/2010 |

OTHER PUBLICATIONS

JP 05314969—Translation.*
ISA/EP, International Search Report of corresponding PCT Appl. No. PCT/EP2011/005945, completed Apr. 12, 2012 and dated Apr. 19, 2012 (total 5 pages).
Korean Intellectual Property Office (KIPO), Office Action from KR Patent Application No. 10-2013-7017146 (PCT/EP2011/005945), dated Jan. 29, 2015 with English translation.
Chinese Patent Office (SIPO), Office Action from CN Patent Application No. 201180055999.4 dated Mar. 26, 2015 with English translation.
Chinese Patent Office (SIPO), Second Office Action from CN Patent Application No. 201180055999.4 dated Aug. 27, 2015 with English translation.
Japanese Patent Office, Notification dated Oct. 20, 2015 of Prior art document offered to JPO from a Third Party on Sep. 18, 2015 with English translation.

(Continued)

Primary Examiner — Ladan Mohaddes
(74) Attorney, Agent, or Firm — Barclay Damon, LLP (57) ABSTRACT

In order to allow for maximum freedom of design in the selection of an electrode or battery shape, a compact configuration and low production costs, the invention specifies a battery electrode and a method for producing same, wherein a collector substrate is coated with a coating film and at least one arrester region is produced thereon by removing the coating film by means of laser ablation.

15 Claims, 7 Drawing Sheets

(56) References Cited

OTHER PUBLICATIONS

European Patent Office, International Search Report with Written Opinion and translation of ISR into English from PCT/EP2011/005945, dated Apr. 19, 2012 (total 15 pages).
European Patent Office, EP Office Action in EP Appl. No. 11 788 777.8-1359 dated Dec. 22, 2015 with English translation.
Japanese Patent Office, Office Action from JP Patent Application JP 2013-540269 dated Jan. 4, 2016.

* cited by examiner

BATTERY ELECTRODE AND METHOD FOR PRODUCING SAME

CROSS-REFERENCE TO RELATED APPLICATIONS

This application claims priority to International Patent Application No. PCT/EP2011/005945 filed Nov. 25, 2011, which claims priority to German Patent Application No. 10-2010-062-140.4, filed Nov. 29, 2010.

TECHNICAL FIELD

The invention relates to a battery electrode and to a method for producing same.

BACKGROUND TO THE INVENTION

In general, a battery indicates both non-rechargeable primary cells and rechargeable secondary cells (also called rechargeable batteries). Batteries are classified on the basis of the underlying chemical redox reaction, the materials used, the electrical values (for example voltage or capacitance) or the geometric or structural design. Examples include alkaline-manganese batteries, zinc-carbon batteries or lithium batteries. A distinction is also drawn between winding cells and stacked batteries in batteries, depending on their inner construction. In the case of a winding cell, the electrode and separator layers which are arranged one above the other are wound up in a spiral manner and installed, for example, in a round battery with a cylindrical housing. In the case of a stacked battery however, a plurality of electrode and separator layers are alternately stacked one above the other.

Figure 1:
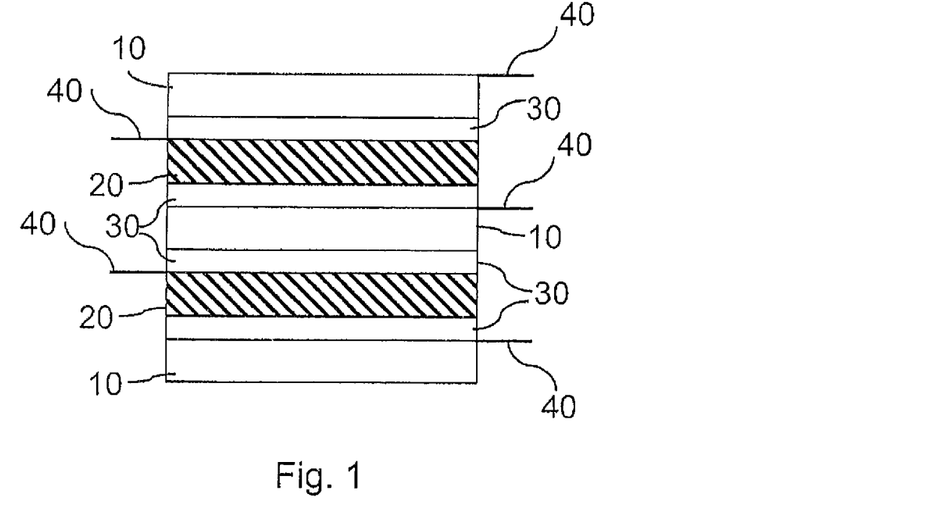
FIG. 1 shows a schematic sectional view of an electrode arrangement in a conventional battery.

FIG. 1 shows, by way of example, a stacked battery. As shown in FIG. 1, an anode 10 and a cathode 20 are alternately arranged in the battery, wherein a separator 30 is arranged between the anode 10 and the cathode 20 in each case in order to physically and electrically separate the two electrodes. However, the separator 30 has to be permeable to ions which cause the conversion of the stored chemical energy into electrical energy. Microporous plastics or nonwovens which are composed of glass fiber or polyethylene are usually used for separators 30. The anodes 10 are connected to one another in their arrester regions 40, as are the cathodes 20, with the result that all electrodes of the same kind in a battery are interconnected. A connection lug 50 (see FIG. 2B) for the cathodes 20 and the anodes 10 is mounted in the arrester regions 40 in each case, said connection lug being connected to a corresponding outer voltage pole of the battery.

Figure 2A:
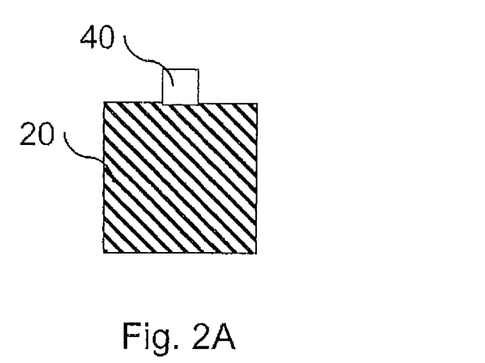
FIGS. 2A and 2B show a plan view of a conventional battery electrode.
Figure 2B:
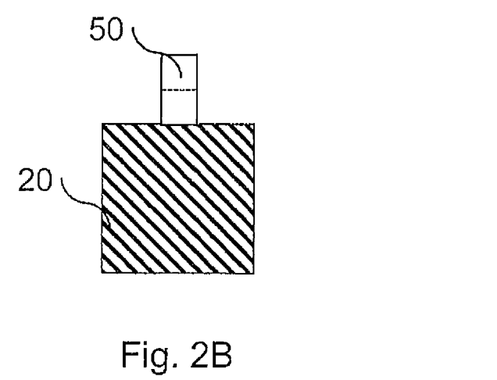

FIG. 2A shows a plan view of a cathode 20 with an arrester region 40. The cathodes 20 are connected to one another in the arrester regions 40 of the cathodes 20 which are arranged one above the other. As shown in FIG. 2B, the connection lug 50 is mounted on the arrester regions 40 which are connected to one another, said connection lug being in contact with the negative pole of the battery after the battery is assembled.

Figure 3:
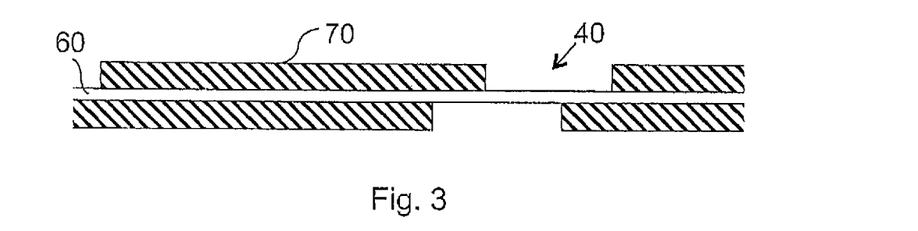
FIG. 3 shows a sectional view of a conventional electrode material.

Battery electrodes are usually prefabricated as bulk or rolled material from which a desired electrode shape is cut out during production of a battery. As shown in FIG. 3, the electrode material comprises a collector substrate 60 which is provided with a coating film 70. In this case, the electrode material has one or more uncoated arrester regions 40 which are required later in the assembled state in order to discharge voltage or current to the outside. A plurality of electrodes of the same kind are connected to one another at, and a metal connection lug 50 is mounted on, the arrester regions 40. When the collector substrate 60 is coated on both sides, arrester regions 40 are therefore also formed on both sides. In this case, the arrester regions do not necessarily have to be formed opposite one another but can be offset in relation to one another, as shown in FIG. 3.

Figure 4A:
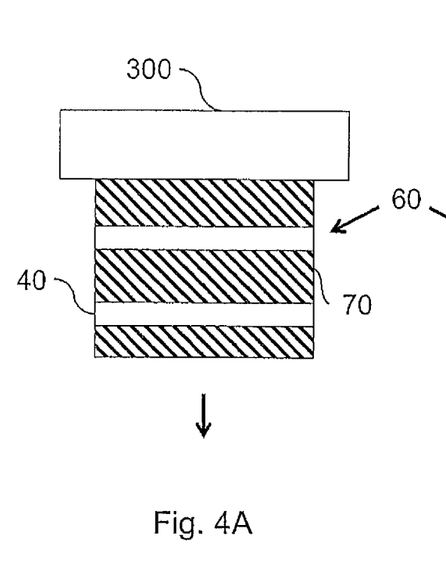
FIGS. 4A and 4B show methods for producing a conventional electrode material.
Figure 4B:
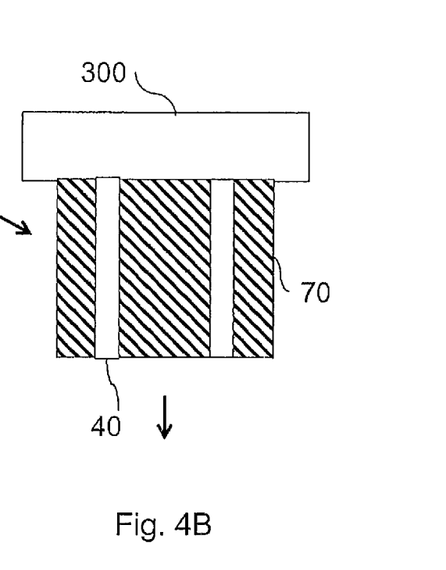

FIGS. 4A and 4B show methods for producing an electrode material by means of a slot die system 300. An ink-like coating film 70 is applied on the strip-like collector substrate 60 and an uncoated arrester region 40 is formed. This application process can be performed either by discontinuous, intermittent coating, wherein an uncoated arrester region 40 is formed by regular or occasional interruption in the coating as shown in FIG. 4A, or by continuous coating, as shown in FIG. 4B. However, forming relatively complex arrester regions using these methods is very complicated. Therefore, masking steps are occasionally used. As an alternative, arrester regions 40 can be exposed on a collector substrate 60 by brushing or similar methods.

After coating, the electrode material is calendered in order to compress the coating film and to eliminate cavities which are produced when the coating film 70 is drying. The finished electrode material can then be rolled up and stored until further processing. A desired shape, which is different depending on the type of battery or shape of the battery, is cut out or stamped out of the electrode material in order to produce a battery. When the battery electrode is cut out, it is additionally necessary to ensure that an arrester region 40 must be present. An example of a rectangular electrode shape with an arrester region 40 is shown in FIG. 2A.

Figure 5:
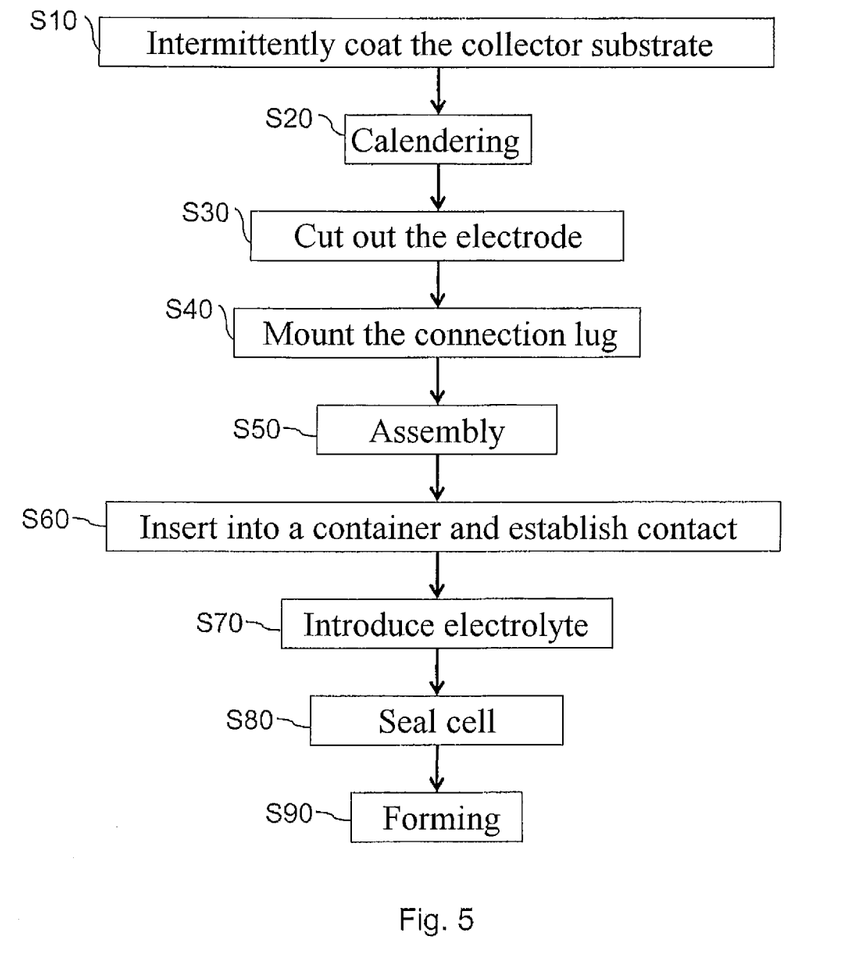
FIG. 5 shows a flowchart of a conventional production method for a battery.

FIG. 5 shows a flowchart which is used to illustrate the production process of a battery, for example a winding cell or a stacked battery. First, the collector substrate 60 is coated with the coating film 70, for example using an intermittent method (S10), wherein a plurality of uncoated arrester regions 40 are formed by interruption or discontinuation when applying the ink-like coating. The electrode material is then calendered (S20). A desired electrode shape can then be cut out or stamped out of the electrode material (S30), wherein the stamped-out shape has to have an arrester region 40. These steps are performed both when producing the anode 10 and when producing the cathode 20. Next, the stamped-out electrodes are arranged one above the other (S40) such that an anode 10 and a cathode 20 with a separator 30 therebetween are arranged alternately in succession (see FIG. 1). In this case, the arrester regions 40 of the cathodes 20 and the arrester regions 40 of the anodes 10 are in each case arranged one above the other and are connected to one another. A connection lug 50 is then mounted on said arrester regions (S50). In this case, the number of anodes 10 and cathodes 20 which are arranged one above the other can vary depending on the type and property of the battery. After the electrode arrangement is complete, the electrode arrangement is inserted into a housing and the connection lugs 50 are connected to the outer voltage poles of the housing (S60). In the case of a winding cell, the electrode arrangement is also wound up in a spiral manner and inserted into the housing in this state. After the electrolyte is introduced (S70), the cell is then sealed (S80) and finally formed (S90).

However, the following problems are encountered in the conventional methods for producing battery electrodes. For example, the production of uncoated arrester regions by masking steps or brushing away the coating is very complex and expensive. In the alternative production method by intermittent or continuous coating with the aid of a slot die system however, the possible shapes and arrangements of the arrester regions on the electrode material are greatly restricted. In view of the various fields of use of batteries, in particular in design products such as mobile telephones, laptops or cars, however, flexibility in respect of the configuration of the battery electrodes is increasingly required. In this case, the trend toward relatively small devices poses a particular challenge to battery production. Firstly, batteries with relatively small dimensions therefore have to be developed, and secondly complex shapes are often required in order to make the most efficient use of the interior of a device as possible. Furthermore, it is difficult to produce regular and clean edge regions between the coating region and the arrester region in the case of an intermittent coating method.

Furthermore, it is difficult and expensive to realize a variety of shapes of the electrodes with the conventional methods. For reasons of cost, a rolled material is usually used as the electrode material, possible positions of the uncoated arrester region 40 in relation to the coating film 70 being fixedly defined in said rolled material. As a result however, the degree of freedom of design for the electrode shape is severely restricted because each electrode has to have an arrester region 40. In addition, a large amount of excess electrode material which has to be disposed of is produced when the desired electrode shape together with the arrester region 40 is cut out. If, for example, small electrodes are cut out such that they contain an arrester region 40, regions of the coated substrate which is situated between successive arrester regions 40 can no longer be used when there is a large distance between said successive arrester regions. As a result, material consumption is increased and the production method is more expensive. Furthermore, a dedicated stamping die for stamping out the desired shape has to be created for each desired electrode shape. However, these stamping dies are very expensive on account of the high demands made on cutting quality.

In the conventional production methods, the arrester region 40 is formed beforehand by a coated electrode region in order to mount the connection lug 50 on said arrester region and to connect electrodes of the same kind to one another. However, this leads to unutilized space in the battery which is not filled with active electrode material. As a result, the size of the battery is unnecessarily increased and/or an outer shape of the battery is fixed.

Furthermore, the arrester regions 40 can be easily contaminated in the conventional production methods or else during storage. Impurities can reach the arrester regions 40 in the case of a calendering process in particular. This has an adverse effect on the quality of an electrical contact between electrodes of the same kind and between the electrodes and an associated connection lug 50. Since the arrester regions 40 are additionally formed before the calendering process during production of the electrode material, calendering is made more difficult on account of the non-uniformly thick structure. In addition, the arrester region 40 which is formed by conventional methods may be poorly defined, wherein particularly an edge region of the arrester region 40 can be formed in an inaccurate and non-uniform manner.

SUMMARY OF THE INVENTION

The object of the present invention is therefore to specify a battery electrode and a production method for said battery electrode which allow for maximum freedom of design when configuring an arrester region and a battery electrode at low production costs.

The object is achieved by the features of the independent claims.

The invention is based on the idea of removing a coating film, formed on a collector substrate, in an arrester region by laser ablation. In this way, the coating film can be produced over a large surface area and continuously on the collector substrate without an arrester region having to be kept open. Owing to the uniform thickness of the areally coated collector substrate, a calendering process is further simplified and can be carried out with better quality. In addition, any desired electrode shape can be cut from the coated collector substrate without being restricted by a predefined position of the arrester region. Consequently, the electrode material can be utilized more efficiently so that less waste material is produced. On account of using a laser to expose the arrester regions, the arrester regions can also be produced on the coated collector substrate in any desired shape and at any desired position with clean and regular edges. This provides absolute freedom of design and the option of producing arrester structures which are optimized in respect of surface area. By way of example, inactive regions on the electrode, i.e. the surfaces of the arrester regions, can be reduced. An inactive volume in the battery can thus also be reduced, e.g. by uncoated arrester regions projecting inwardly into a coated region of the electrode or being formed within the coated regions. Alternatively, at least half a circumference of the arrester region can be surrounded by the coated region.

Any suitable laser system, for example cutting or engraving laser systems, can be used for removing the material by means of laser ablation. On account of the high edge quality and cutting precision in respect of cut guidance and penetration depth, high-quality arrester regions can be produced. Furthermore, by virtue of the use of ultra-short laser pulses, the energy input can be reduced, with the result that thermal loading of the electrode material is kept low. Since suitable laser systems are comparable to slot die systems in respect of cost, high purchase costs are not incurred.

According to one aspect of the present invention, a method for producing a battery electrode is specified. In this method, a coating film is first applied on a collector substrate. The coating film is then removed using a laser in at least one arrester region. This can be performed by pulsed laser radiation or continuous laser radiation. The coating film is possibly formed on both sides of the collector substrate in order to increase the size of an active surface of the electrode. At least one arrester region can then be formed on the two sides of the collector substrate in each case. In addition, the coating film can be formed such that it substantially completely covers at least one of the two surfaces of the collector substrate, without leaving free edges or free regions uncoated. For coating purposes, a continuous coating method, for example doctor blade, comma bar or kiss coating, is preferably used. As a result, a greater degree of processing reliability and therefore a better quality of the electrode material can be ensured at low production costs.

In a further exemplary embodiment, it is not only the coating film that is removed using a laser in an arrester region, but a thin layer on the surface of the collector substrate is also removed, with the result that a fresh, clean surface is produced. As a result, impurities and oxidized layers in the arrester region can be removed, as a result of which contact resistance between the electrodes and a connection lug is reduced. The connection lug is preferably attached to the arrester region immediately after the arrester region is produced, wherein the production of the arrester region can comprise either only the removal of the coating film or the removal of the coating film and of a surface layer of the collector substrate. Therefore, the occurrence of impurities can be avoided, it being possible for these impurities to present a serious danger to a finished battery and cause the formation of dendrites with the resulting short circuit, for example abrasive particles or coating residues which are produced during brushing, by using a laser for removing the coating film and/or a surface layer of the collector substrate.

In a preferred embodiment of the method according to the invention, the battery electrode is cut out in a predefined shape with the aid of the laser either before or after the at least one arrester region is produced. In this way, any desired electrode shape can be selected, without special tools, for example particular stamping dies, having to be created. As a result, the freedom of design when producing the battery electrode is further increased and the operating procedure is optimized. The working time and an additional tool can be saved by forming the arrester region and cutting out the battery electrode by means of laser since changing over of the electrode material which is to be processed and of the tool is dispensed with. Therefore, the arrester region, or else the battery electrode, can be produced in any desired shape, for example round, semicircular, annular, rectangular or triangular. In addition, the arrester region can be arranged on the coated electrode surface in any desired manner. The arrester region preferably projects into the coated electrode surface such that a relatively large portion of its circumference, or at least half of it, is surrounded by the coated electrode surface. In this case, the remaining portion of the circumference of said arrester region can adjoin an outer edge of the battery electrode. As an alternative, the arrester region can be arranged entirely within the coated electrode surface. In this way, an inactive region or dead volume can be reduced when the battery is assembled, with the result that a capacity and a volumetric energy density is increased given the same battery size.

Furthermore, at least one cutout can be formed in the battery electrode. The cutout in an electrode preferably corresponds to an arrester region which is formed on an electrode of a different kind, so that the arrester regions of the electrodes of the same kind which are arranged one above the other can be connected to one another through the other electrodes in the case of an alternating electrode arrangement. This may be advantageous, for example, when the arrester region of an electrode projects inwardly into a coated electrode region or is completely surrounded by said coated electrode region. When the battery electrode is cut out by means of laser cutting, the cutout can likewise be cut out with the aid of the laser in order to optimize a method sequence.

In a further preferred embodiment of the present invention, a process gas is blown onto the substrate during the laser ablation of the coating film and/or during the laser ablation of the surface layer of the collector substrate and/or during the laser cutting. As a result, residues produced by the laser processing can be removed as early as during the process. In addition, a process gas which suppresses oxidation or other undesired chemical surface reactions can be used. The process gas is preferably cold, in order to cool the electrode material during the laser processing.

A battery electrode which contains a collector substrate, a coating film, which is formed on the collector substrate, and an arrester region is specified in a further aspect of the present invention, wherein the arrester region is formed by removing the coating film using a laser. The arrester region is therefore formed by an uncoated region of the collector substrate. The battery electrode can be produced according to any one of the above-described exemplary embodiments of the method according to the invention.

A battery which contains a battery electrode which is produced according to any one of the above-described exemplary embodiments of the method according to the invention is specified as a further aspect of the present invention.

BRIEF DESCRIPTION OF THE FIGURES

In the figures

DETAILED DESCRIPTION OF THE INVENTION

The invention will be described below using the example of the lithium-ion battery which is distinguished by a high energy density and thermal stability. However, the present invention is not intended to be restricted to lithium-ion batteries but can be applied to any desired battery.

In a lithium-ion battery, a collector substrate 60 of an anode 10 is composed, for example, of copper which is coated with a coating film 70 which is composed of graphite, binder, carbon black and solvent. According to the present invention, the coating film 70 in an arrester region 40 is removed, with the result that the collector substrate 60 in the arrester region 40 is exposed. A connection lug 50, which is composed of nickel, can be mounted on the arrester region 40 of the anode 10. In the case of the cathode 20, a collector substrate 60 is composed, for example, of aluminum and is coated with a coating film 70 comprising an active material which contributes to a redox reaction, binder, carbon black, graphite and solvent. The connection lug of the cathode is preferably likewise composed of aluminum.

Figure 6:
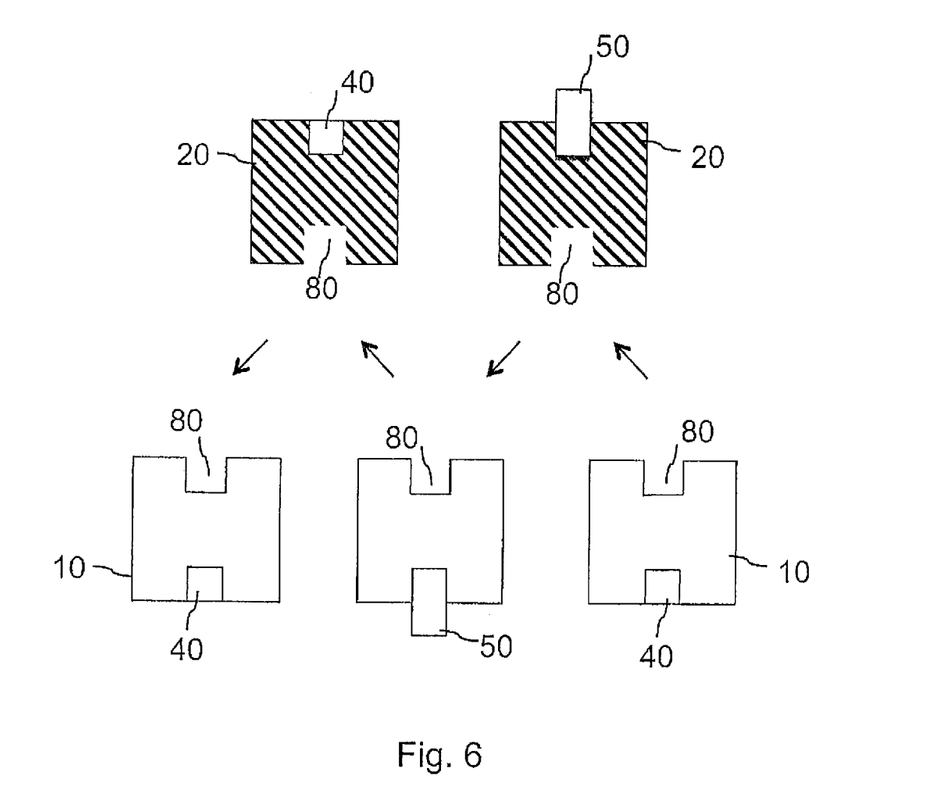
FIG. 6 shows battery electrodes according to a first exemplary embodiment of the present invention.

FIG. 6 shows battery electrodes according to the present invention in which an arrester region 40, at its circumference, predominantly adjoins the coating film 70 on the collector substrate 60. Both the anodes 10 and the cathodes have an internal arrester region 40 and a cutout 80. The cutout 80 is formed at a position which corresponds to the arrester region 40 of the respective electrode of a different kind in the assembled state. The cutouts 80 in the anodes 10 are consequently arranged such that they are situated above or below the arrester regions 40 of the cathodes 10 in the assembled state of the electrodes. The arrows in FIG. 6 indicate an electrode arrangement in the assembled state, wherein in each case an anode 10 and a cathode 20 are alternately arranged one above the other in each case. In this case, a separator 30 (not shown) is arranged between the anodes 10 and cathodes 20, it being possible for said separator to comprise microporous films or nonwovens. In the arrester regions 40, connection lugs 50 can be mounted in each case on at least one of the anodes 10 and on at least one of the cathodes 20 before the electrodes are assembled. However, the connection lugs 50 are preferably mounted on the arrester regions 40 after the electrodes are assembled, for example by ultrasonic welding. Since, in this exemplary embodiment, an arrester region 40 of an electrode is situated opposite a cutout 80 in an electrode of a different kind, in this case the anodes 10 and, respectively, the cathodes 20 can at the same time in each case be electrically connected to one another at their arrester regions 40.

It is also possible to form only the cathodes or only the anodes with an internal or inwardly projecting arrester region, wherein the other of the two electrodes is produced in accordance with the conventional method with a protruding arrester region.

Figure 7:
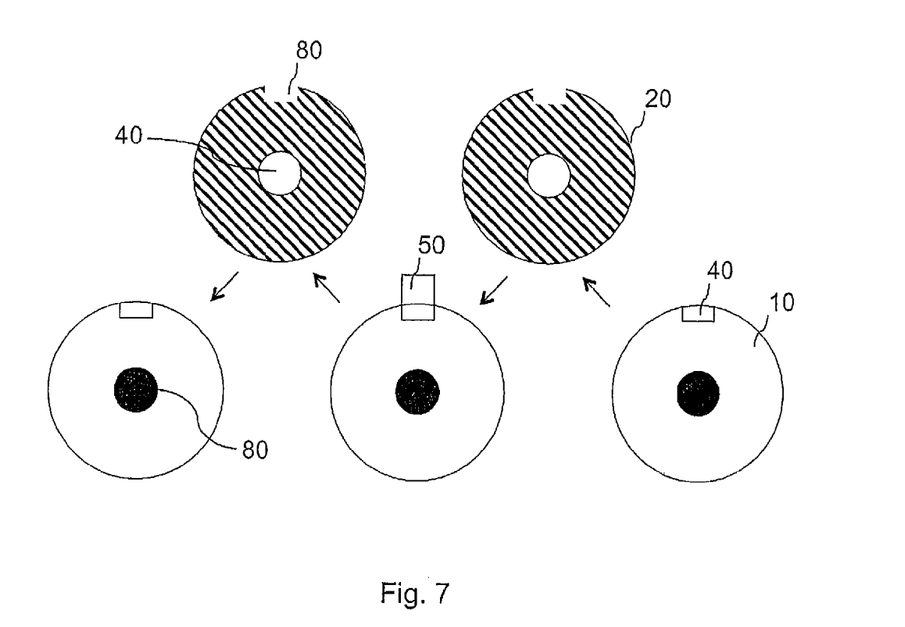
FIG. 7 shows battery electrodes according to a further exemplary embodiment of the present invention.

FIG. 7 shows a further exemplary embodiment of battery electrodes according to the present invention. The anodes 10 illustrated in FIG. 7 have a round cutout 80 in their center, whereas the cathodes 20 have a corresponding arrester region 40 in their center. The arrester region 40 of the anodes 10 is formed at its circumferential edge, with the result that the cathodes 20 have a cutout 80 at this position. As described above, the arrester regions 40 of the electrodes of the same kind are connected to one another and connection lugs 50 are each mounted in the arrester regions 40 of the anodes 10 and the cathodes 20.

Figure 8:
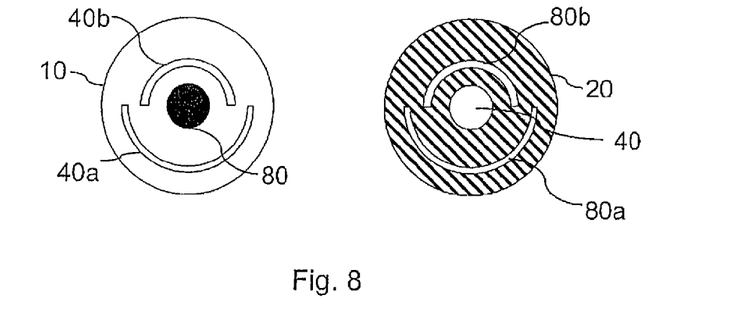
FIG. 8 shows battery electrodes according to another exemplary embodiment of the present invention.

FIG. 8 shows a further example of battery electrodes according to the present invention. In this exemplary embodiment, the arrester regions 40 are completely surrounded by the coating film 70. In this case, the anode 10 has two arrester regions 40a and 40b and the cathode 20 has two corresponding cutouts 80a and 80b. In this case, in each case one connection lug 50 is fitted to each of the two arrester regions 40a and 40b of the anode 10. Forming a plurality of arrester regions 40 on an electrode can lead to improved voltage dissipation and reduce a resistance.

Figure 9:
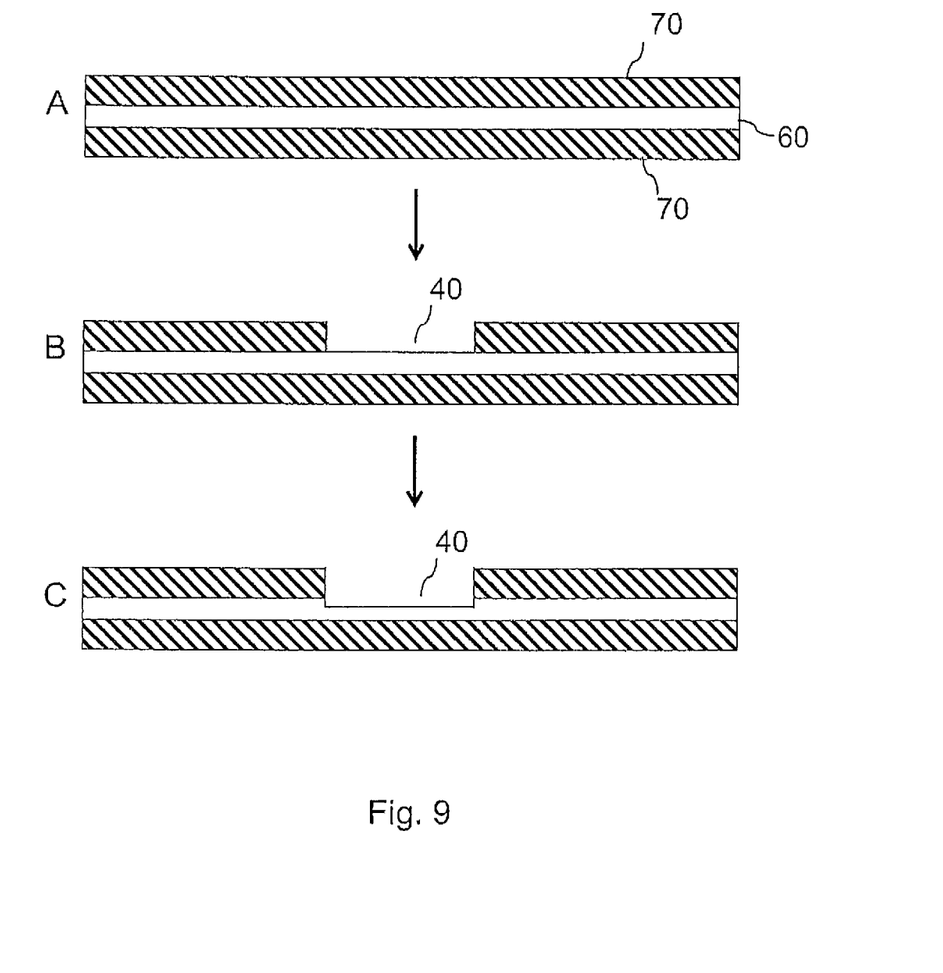
FIGS. 9A-9C show sectional views through an electrode material during a production process according to the present invention.

An exemplary method for producing the battery electrodes is explained below. According to the present invention, a collector substrate 60 is first, as shown in FIG. 9A, coated with a coating film 70 over a large surface area and on both sides. However, the collector substrate 60 can also be coated over a large surface area or substantially completely only on one surface. The coating film 70 is applied to the collector substrate 60 in a liquid state. Simple, continuous coating technologies, for example doctor blade, comma bar or kiss coating, can be used in this case. The coating film 70 is then dried or cured, wherein a thickness of the coating film 70 in the dry state is, for example, approximately 25 µm. After the coating film 70 has dried or cured, the coated collector substrate 60 is calendered in order to compress the coating film 70. On account of the uniform thickness of the collector substrate 60, the calendering process is simplified and can be carried out more efficiently, with the result that the quality of the electrode material is improved. Furthermore, the coated collector substrate 60 can be stored as rolled material and is available as electrode material for subsequent further processing.

As shown in FIG. 9B, at least one arrester region 40 is then formed on the coated collector substrate 60 by the coating film 70 in the arrester region 40 being removed by laser ablation and the collector substrate 60 which is situated beneath it being exposed. In the case of laser ablation, material is removed from the surface by being subjected to the action of laser radiation. By way of example, pulsed laser radiation with a high power density is used for this purpose. Since thermal conduction allows only very slow transportation of energy into the volume, the irradiated energy is concentrated on a very thin layer at the surface. As a result, the surface is heated to a great extent and the material is suddenly evaporated or fused. In order to ensure sufficient absorption of the laser light, a wavelength of the laser radiation is selected as a function of the material which is to be removed. An engraving or cutting laser system is preferably used, for example with an ytterbium laser with a wavelength of 1070 nm. However, other gas, solid or fiber lasers can also be used. During the processing process, a process gas or blowing gas can also be conducted onto the surface in order to drive the removed material out of the kerf or to prevent undesired chemical reactions at the surface. No harmful impurities are generated by the material being evaporated or fused.

Since the arrester regions 40 are produced by laser ablation, any desired arrester region shapes and arrangements can be formed. In particular, the arrester regions 40 can be arranged on the electrode surface such that they do not protrude from the battery electrode. As a result, an energy density/volume ratio can be increased and the size of a battery can be reduced given the same electrical properties. The arrester region 40 is formed preferably immediately before electrodes of the same kind are connected or a connection lug 50 is fitted in the arrester regions 40. By way of example, electrodes of the same kind which are situated one above the other can be connected to one another by a welded contact in the arrester regions 40. In this case, a connection lug 50 can be mounted on one of the arrester regions 40 at the same time. Since the arrester regions 40 are only formed shortly before the electrode material is further processed, a fresh, clean surface is available for establishing contact between the electrodes of the same kind and for fitting the connection lug 50. As a result, passivation layers, for example oxidized surfaces and other impurities, in the arrester region 40 can be avoided.

It is possible for not only the coating film 70 in the arrester region 40, but also, as shown in FIG. 9C, a thin layer of the collector substrate 60, to be removed by means of laser. By virtue of the use of laser systems with a high level of cutting precision, the penetration depth of the laser can be exactly controlled, with the result that the depth of the material removal can be selected as desired. Therefore, a collector substrate 60 in the arrester region 40 can be thinned down in a targeted manner in order to reduce an electrical contact resistance. In addition, the surface condition for making electrical contact can be improved as a result.

Figure 10:
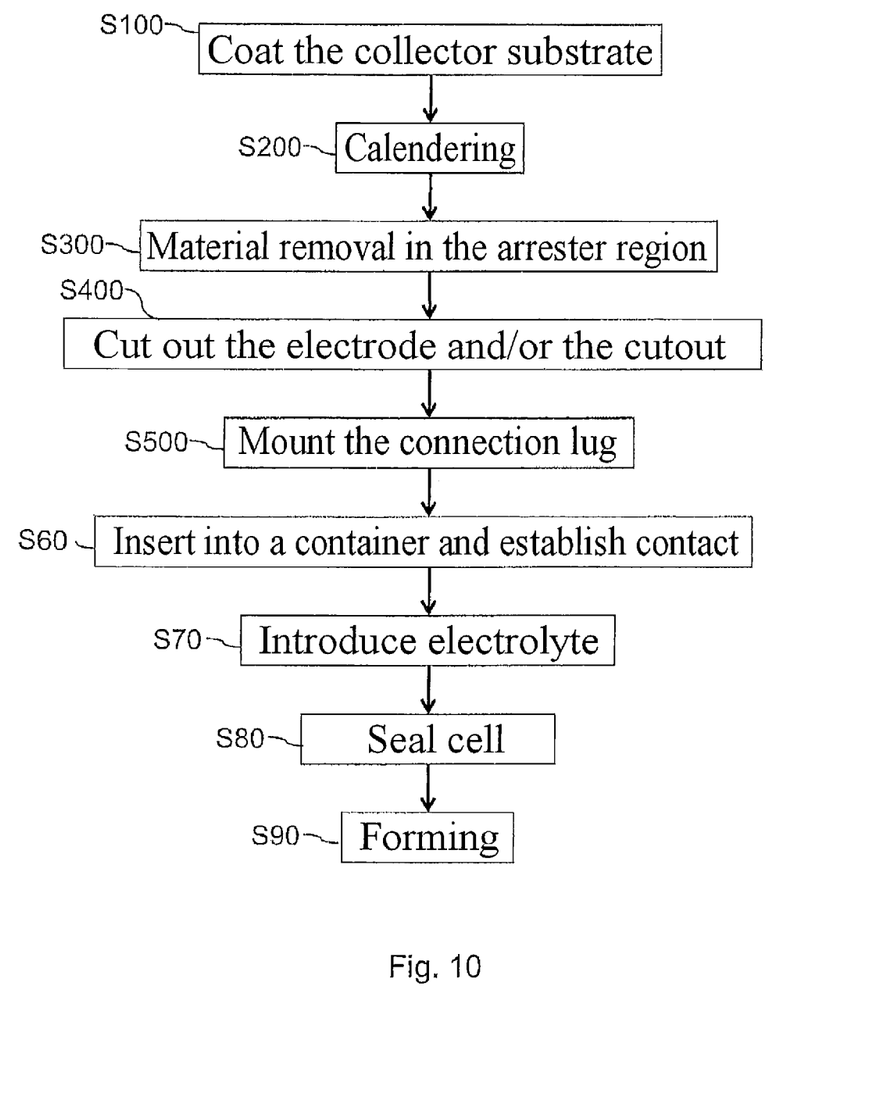
FIG. 10 shows a flowchart of a production method according to an exemplary embodiment of the present invention.

FIG. 10 shows a flowchart of a production process of a battery according to the present invention. First, an ink-like coating film 70 is applied over a large surface area or substantially completely on a collector substrate 60 which comprises a metal strip which is approximately 8-20 µm thick (S100). After the coating film 70 which is approximately 25 µm thick in the dried state has dried or cured, the uniformly coated collector substrate 60 is calendered (S200) in order to remove cavities and irregularities, which were produced during drying, from the coating film 70. The calendered and coated collector substrate 60 can now be stored as rolled material until it is further processed. In order to finish the battery electrode, the coating film 70 in a prespecified arrester region 40 on the coated collector substrate 60 is removed by laser ablation (S300). A thin layer of the collector substrate 60 in the arrester region 40 may additionally be removed in order to improve a surface quality for making electrical contact. In the next step S400, the electrode and possibly the cutouts 80 is/are cut out of the coated collector substrate 60 in a desired shape. The electrode or the cutout 80 is preferably cut out by laser, but, as an alternative, a stamping apparatus can also be used. The order of steps S400 and S300 can also be interchanged. Anodes 10 and cathodes 20 are then arranged alternately one above the other such that the arrester regions 40 of electrodes of the same kind are situated opposite one another in each case, wherein the cutouts 80 in the cathodes 20 are arranged between the arrester regions 40 of the anodes 10, and vice versa. The arrester regions 40 of electrodes of the same kind are then in each case connected to one another, for example by ultrasonic welding, wherein in each case one connection lug 50 is mounted on said arrester regions (S500). As an alternative, the connection lug 50 can also be fitted in each case to one of the cathodes 20 or anodes 10 before the electrodes are assembled.

The further steps correspond to those of the conventional method for producing a battery. The electrode arrangement is inserted into a container and the connection lugs 50 are connected to the outer voltage poles of the battery (S60). An electrolyte is then introduced (S70) and the cell is sealed (S80). Finally, forming (S90) is carried out.

According to the present invention, battery electrodes can be produced in a cost-effective manner and with a high quality by the arrester region being produced by laser ablation on the coated collector substrate. Complex outlines can also be cut out or removed in a precise and rapid manner on account of the high cutting precision in respect of cutting guidance and penetration depth of lasers. In addition, a maximum degree of freedom of design is possible since an arrester region can be formed using a laser system at any desired point and in any desired shape designed on a computer. In particular, the arrester regions can be formed such that they do not protrude from an outer circumference of the battery electrode, but rather project inwardly into a coated region of the battery electrode. As a result, a higher capacity and energy density can be achieved given the same battery size. Furthermore, a space-optimized arrester region can be formed, with the result that only a region which is absolutely necessary is exposed by laser ablation. This saves on further working steps for removing superfluous uncoated electrode surfaces and moreover material. Furthermore, the production of battery electrodes is cost-effective even at low minimum quantities, with the result that individually configured batteries can also be produced with a low level of outlay and at low costs. Furthermore, flexibility in respect of production and material utilization is increased. In addition, simple continuous coating technologies for producing the coated collector substrate can be used by using a laser for forming the arrester regions, with the result that a production process is more cost-effective. In addition, a fully coated collector substrate is easier to calendar and better to store. Since the arrester region can be produced immediately before contact is made, impurities or passivation layers in the contact region can be avoided and a contact resistance can be reduced by virtue of a production method according to the invention.

The invention claimed is:

1. A method for producing a battery electrode, the method comprising:

continuously applying a coating film onto a first side of a metal collector substrate over a large surface area in a uniform thickness, the metal collector substrate being a bulk or rolled material, the coating film including graphite, binder, carbon black and solvent, and wherein the coating film fully covers and coats the first side of the metal collector substrate, then, drying and curing the metal collector substrate having the coating film thereon;

then, calendering the metal collector substrate after the drying and curing step;

following the calendaring step, then forming at least one arrester region on the first side of the metal collector substrate and projecting into the battery electrode, the forming of the at least one arrestor region including:

removing the coating film and a surface layer on the first side of the metal collector substrate using laser ablation and controlling the penetration of a laser into the metal collector substrate to a desired depth of the surface layer of the metal collector substrate in the at least one arrestor region, wherein an edge of the at least one arrestor region is surrounded by a covered region of the metal collector substrate having the coating film; and cutting out at least one battery electrode in any desired form from the metal collector substrate having the at least one arrester region.

2. The method as claimed in claim 1, further comprising applying the coating film on a second side of the metal collector substrate that is opposite the first side of the collector substrate.

3. The method as claimed in claim 2, further comprising forming at least one arrester region on the second side of the metal collector substrate, including removing the coating film on the second side of the metal collector substrate using laser ablation.

4. The method as claimed in claim 1, further comprising contacting the at least one arrester region on the first side of the metal collector substrate using a connection lug immediately after forming the at least one arrester region.

5. The method as claimed in claim 4, further comprising laser cutting the battery electrode, a cutout region, or both, in which the cutout region is a cutout of the coating film and the metal collector substrate, wherein the cutout region corresponds to the at least one arrester region.

6. The method as claimed in claim 1, further comprising forming the at least one arrester region on the first side of the metal collector substrate in a round, annular, rectangular, or triangular shape or as a cutout therefrom.

7. The method as claimed in claim 5, further comprising blowing a process gas onto the first side of the metal collector substrate during the step of using laser ablation or during the step of laser cutting.

8. A battery electrode made in accordance with the method of claim 1.

9. A battery comprising: a battery electrode made in accordance with the method of claim 1.

10. The method as claimed in claim 2, wherein the step of applying the coating film on the first side or the second side of the metal collector substrate comprises using a continuous coating technology.

11. The method as claimed in claim 3, wherein the step of removing the coating film on the second side of the metal collector substrate includes removing a layer of the second side of the metal collector substrate using laser ablation in the at least one arrester region, thereby forming a clean surface free of impurities and oxidized layers.

12. The method as claimed in claim 11, further comprising contacting the at least one arrester region on the second side of the collector substrate using a connection lug immediately after forming the at least one arrester region.

13. The method as claimed in claim 12, further comprising laser cutting the battery electrode, a cutout region, or both, wherein the cutout region is a cutout of the coating film and the metal collector substrate, wherein the cutout region corresponds to the at least one arrester region.

14. The method as claimed in claim 2, further comprising forming the battery electrode in the metal collector substrate as a round, annular, rectangular, triangular shape or as a cutout therefrom.

15. The method as claimed in claim 13, further comprising blowing a process gas onto the second side of the metal collector substrate during the step of using laser ablation or during the step of laser cutting.

\* \* \* \* \*